B. M. MATHIAS.
FREIGHT CAR WALL CONSTRUCTION.
APPLICATION FILED JULY 22, 1916.
1,219,832.
Patented Mar. 20, 1917.
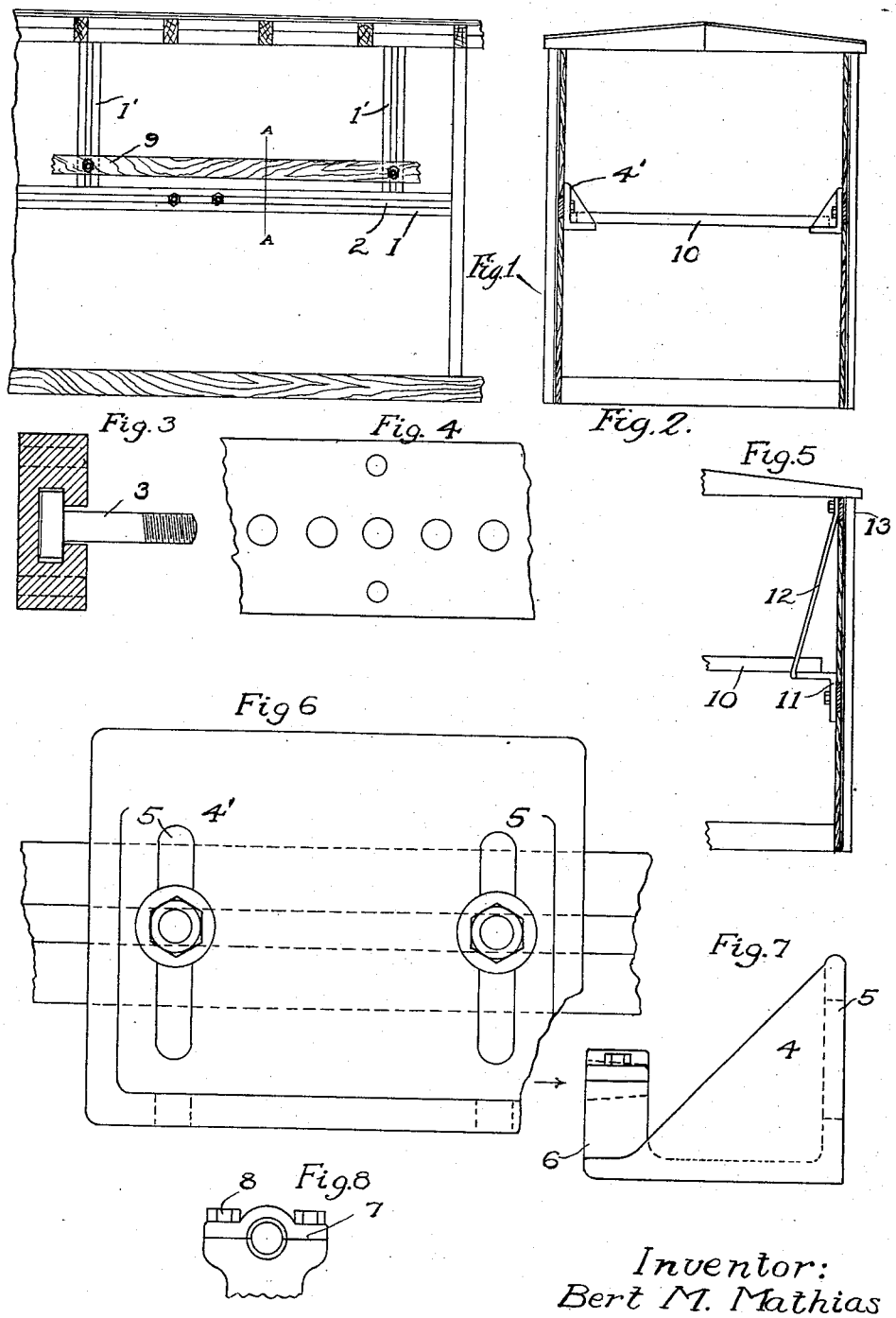
Inventor:
Bert M. Mathias
by C. D. Enochs
Attorney.

UNITED STATES PATENT OFFICE.

BERT M. MATHIAS, OF MINNEAPOLIS, MINNESOTA.

FREIGHT-CAR-WALL CONSTRUCTION.

1,219,832.     Specification of Letters Patent.     Patented Mar. 20, 1917.

Application filed July 22, 1916. Serial No. 110,774.

*To all whom it may concern:*

Be it known that I, BERT M. MATHIAS, a citizen of the United States, residing at Minneapolis, county of Hennepin, and State of Minnesota, have invented new and useful Improvements in Freight-Car-Wall Constructions, of which the following is a specification.

One object of my invention is to provide means for supporting an upper deck so that automobiles may be shipped one above the other in a freight car.

Another object of my invention is to provide in a freight car wall means for readily attaching thereto a supporting beam for an automobile shipping deck.

Another object of my invention is to provide in a freight car wall means for suspending therefrom an automobile shipping bracket.

Another object of my invention is to provide for a freight car an automobile bracket of unique construction.

Another object of my invention is to provide in a freight car wall adjustable means for supporting beams or brackets therefrom.

With these and incidental objects in view, the invention consists of certain novel features of construction and combination of parts, essential elements of which are hereinafter described with reference to the drawing which accompanies and forms a part of this specification.

In the drawing, Figure 1 is a sectional view of a portion of my improved car wall construction from side elevation, and Fig. 2 is a sectional view from end elevation.

Fig. 3 is a sectional view of a supporting bar forming a part of the wall taken on the line A A, Fig. 1.

Fig. 4 is an enlarged side elevation detail of an alternate construction of the bar shown in Fig. 3. Fig. 5 is a sectional detail showing a modification of the bracket as applied to the car wall.

Fig. 6 is an enlarged sectional detail of the bracket and supporting bar showing the means of adjustment.

Fig. 7 is a side elevation of my preferred construction of the bracket, and Fig. 8 is an end view of the spindle bearing support portion of the bracket shown in Fig. 7.

In my preferred construction I form a car wall having as an integral part thereof the bar 1, Fig. 1, having a T slot 2 running longitudinally thereof as better shown in Fig. 3.

Bolts 3, Fig. 3, in this T slot provide means for readily attaching beams or brackets thereto, the bolts being longitudinally adjustable in the slot. The brackets 4, Figs. 6 and 7, have vertical slots 5 therein providing vertical adjustment of the brackets.

My preferred construction of bracket has a supporting element 6 extending vertically to receive the wheel spindles of automobiles and a cap 7, Fig. 8, attached thereto with bolts or cap screws 8 to provide means for readily clamping the spindles in the brackets.

As an alternate construction of the car wall proper, I use instead of the bars 1 running longitudinally, similar vertical bars 1', or I may utilize both styles of bars.

In place of the construction shown in Figs. 7 and 8, I sometimes use a bracket 4', Figs. 2 and 6, and bolt thereto cross beams 10 on which the upper automobile may be supported by any suitable means.

As a further modification, I utilize an inverted L shaped bracket 11, Fig. 5, having a supporting member 12 running upwardly to a bar 13 similar to the bar 1, Fig. 1, to which the support is bolted and on this bracket I bolt the cross bar 10.

While I have described my invention and illustrated it in several particular designs, I do not wish it understood that I limit myself to these constructions, as it is evident that the application of my invention may be varied in many ways within the scope of the following claims:

Claims:

1. In a freight car wall, the combination of wall members, one of which is a longitudinal bar having a longitudinal T slot therein, and a vertically adjustable bracket supported by said bar, and means associated with said bracket for supporting an automobile thereon.

2. In walls for freight cars, the combination of a series of bars constituting oppositely disposed walls, one of said bars in each of said walls having a longitudinal T slot therein, brackets adjustably mounted and each of said bars having a T slot therein, and means supported by said brackets for supporting an automobile.

3. In a freight car wall, the combination of a series of wall members, one of which comprises a horizontal supporting bar having a T-slot running longitudinally thereof, and brackets having slots running vertically thereof, and a bolt connection between said bracket and said bar, whereby the T slots in said bar and the vertical slots in said bracket, provide longitudinal and vertical adjustment of said bracket.

BERT M. MATHIAS.

Copies of this patent may be obtained for five cents each, by addressing the "Commissioner of Patents, Washington, D. C."